(12) United States Patent
Choi (10) Patent No.: US 8,756,005 B2
(45) Date of Patent: Jun. 17, 2014

(54) TURN-BY-TURN NAVIGATION-BASED DESCRIPTIVE DIRECTION INDICATOR FOR VEHICLES

(75) Inventor: Yong Hoon Choi, Mountain View, CA (US)

(73) Assignee: Deutsche Telekom AG, Bonn (DE)

( * ) Notice: Subject to any disclaimer, the term of this patent is extended or adjusted under 35 U.S.C. 154(b) by 630 days.

(21) Appl. No.: 12/978,708

(22) Filed: Dec. 27, 2010

(65) Prior Publication Data

US 2012/0166078 A1      Jun. 28, 2012

(51) Int. Cl.
*G01C 21/00*       (2006.01)

(52) U.S. Cl.
USPC .......................................... 701/436; 701/400

(58) Field of Classification Search
USPC ............ 701/400, 117–119, 23–24, 28, 701/423–425, 428, 409, 487, 431, 436; 340/988, 995.1
See application file for complete search history.

(56) References Cited

U.S. PATENT DOCUMENTS

| 5,731,755 | A | 3/1998 | Boxer |
| 2002/0009978 | A1* | 1/2002 | Dukach et al. ................. 455/99 |
| 2005/0187710 | A1 | 8/2005 | Walker |
| 2006/0167620 | A1* | 7/2006 | Takagi et al. ................. 701/200 |
| 2007/0058257 | A1* | 3/2007 | Lynam ........................ 359/604 |

* cited by examiner

*Primary Examiner* — Yonel Beaulieu
(74) *Attorney, Agent, or Firm* — Leydig, Voit & Mayer, Ltd.

(57) ABSTRACT

A system for providing an externally visible signal regarding a navigational instruction at a vehicle includes a navigation system, a navigation message sender, a navigation message receiver, and a display system. The navigation system generates and outputs turn-by-turn navigational directions within the vehicle to assist a driver of the vehicle in reaching a given destination location. The navigation message sender receives the turn-by-turn navigational directions and transmits them to the navigation message receiver. The navigation message receiver provides a navigational message to the display system for display in a manner visible outside the vehicle.

18 Claims, 6 Drawing Sheets

TURN-BY-TURN NAVIGATION-BASED DESCRIPTIVE DIRECTION INDICATOR FOR VEHICLES

FIELD

The invention relates generally to vehicle direction indication devices generally and, more particularly, to a vehicle direction indicator device that utilizes information provided by a turn-by-turn navigation system for enhancing driving safety.

BACKGROUND

Modern cars have devices enabling drivers to express their intentions to other drivers with respect to upcoming stops or turns. The most common mechanism for indicating driving intentions is a signal lamp or light activated from within the vehicle and visible from outside the vehicle, e.g., turn/stop signal lamps. Such signaling lights are often found on the front and rear of vehicles.

Referring more specifically to turn signal lamps or other direction indicators, such indicators traditionally show only the direction (left or right) that the driver intends to turn the vehicle, and not the degree or timing of the turn. In complex road topology, however, left/right direction indicators are not enough. Drivers often misunderstand others' direction intention so that the misunderstanding results in accidents. Even in a simple road topology, such a misinterpretation may happen due to the lack of information.

By way of example, a segment of US HWY 101 North includes, in very close proximity, the flowing possible right turns: right onto US 101, right to exit to Interstate highway 280, right to exit to Interstate highway 680, right to exit to Story Rd North, and right to exit to Story Rd South. If a tailing driver drives on US HWY 101 North at this point and sees that a car ahead is flashing its right turn signal, the right turn signal can be interpreted in many different ways, and is thus of little or no use to the driver of the tailing vehicle.

While the disclosed principles herein are directed at least in part to overcoming one or more disadvantages, noted or otherwise, it will be appreciated that the innovation herein is defined by the attached claims without to regard to whether and to what extent the specifically claimed embodiment overcomes one or more of the noted problems in the existing technology.

SUMMARY

A system for providing an externally visible signal regarding a navigational instruction at a vehicle includes a navigation system, a navigation message sender, a navigation message receiver, and a display system. The navigation system generates and outputs turn-by-turn navigational directions within the vehicle to assist a driver of the vehicle in reaching a given destination location. The navigation message sender receives the turn-by-turn navigational directions and transmits them to the navigation message receiver. The navigation message receiver provides a navigational message to the display system for display in a manner visible outside the vehicle.

In a further aspect, a method is disclosed for providing an externally visible signal at a vehicle to signal a trailing driver of an imminent turn of the vehicle. The method includes a number of steps including generating turn-by-turn navigational directions within the vehicle to direct a driver of the vehicle in reaching a given destination location, determining whether the driver of the vehicle has actuated a user-selectable turn indicator, and providing a message based on the turn-by-turn navigational directions to an external display system if the driver of the vehicle has actuated the user-selectable turn indicator, wherein a display surface of the external display system is visible outside the vehicle.

In yet a further aspect an apparatus is disclosed for alerting a vehicle non-occupant of an imminent turn of the vehicle. The apparatus includes a navigation interface and an external display device. The external display device is configured to be mounted to an external surface of the vehicle, and the navigation interface is configured to interface to an in-vehicle guidance system, a user-actuated turn signal, and the external display device, such that when the user-actuated turn signal is active, turn-by-turn directions are retrieved from the in-vehicle guidance system and a directional message based on the turn-by-turn directions is provided to the external display device for display to the non-occupant.

BRIEF DESCRIPTION OF THE DRAWINGS

Other features and advantages of the disclosed invention will be apparent from the following description taken in conjunction with the Figures, of which.

DETAILED DESCRIPTION

In an embodiment, the invention relates to a vehicle direction indicator device that utilizes information provided by turn-by-turn navigation systems to enhance driver safety. A device according to an embodiment may be connected wirelessly or otherwise and communicates with a turn-by-turn navigation system that provides detailed directions to a given destination via text, graphics, and/or speech. The navigation system, which is located within the vehicle, may be by way of pre-installed (before-market) head-unit-type navigation systems, portable navigation systems, and navigation software installed on multi-purpose mobile devices.

The device receives turn-by-turn navigation directions provided by the navigation system via wired or wireless networks and displays them on the display system. The display screen can be installed in any suitable location in or on the vehicle as allowed by law, such that drivers in following vehicles can observe navigation messages displayed on the display system. Navigational messages may have richer content than the binary (on/off) turn signal lamps of modern vehicles. The contents of the navigational messages may include but are not limited to a next action, an immediate destination, and a distance to a location where the next action should be taken. By knowing not just left or right, but also richer navigation information of a preceding driver, trailing drivers can predict a next driving action so as to avoid collisions or accidents due to misinterpretation of the preceding driver's intention.

Figure 1:
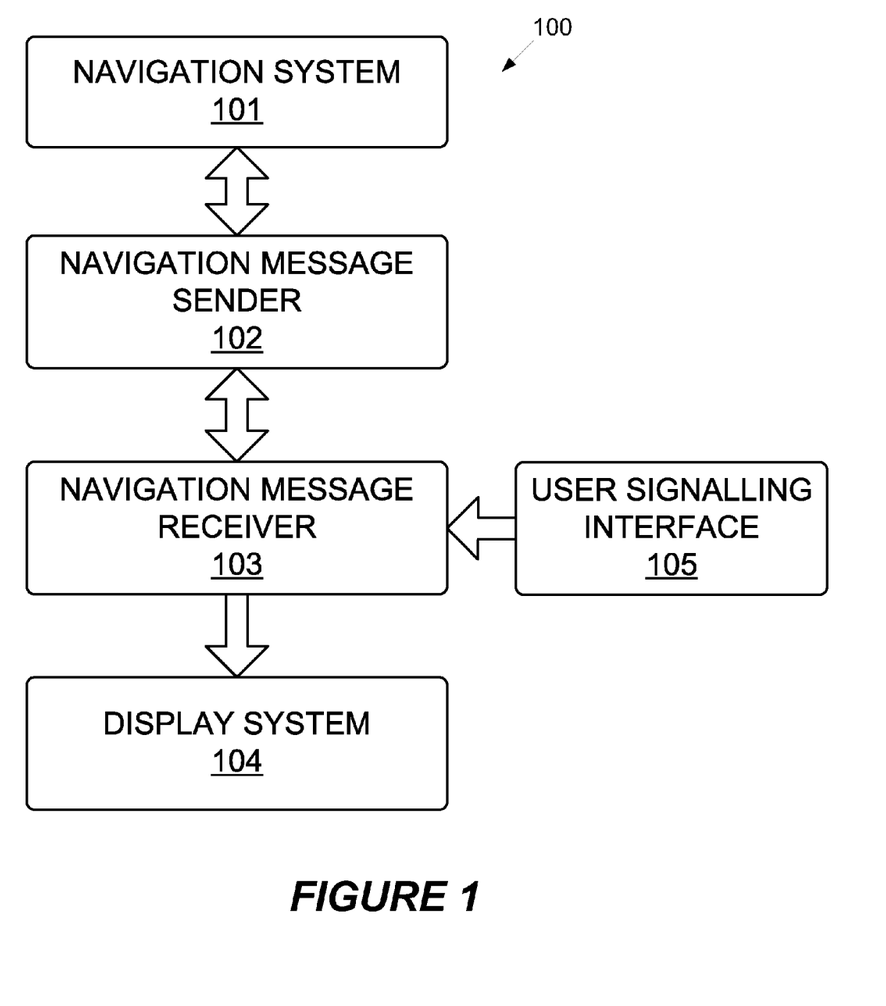
FIG. 1 is a schematic illustration of a system architecture according to an embodiment of the invention.

An overall architecture of a system 100 according to an embodiment of the invention is shown in FIG. 1. The system 100 consists of Navigation System (101), Navigation Message Sender (102), Navigation Message Receiver (103), Display System (104), and User Signalling Interface (105). The Navigation System (101) provides turn-by-turn navigational directions to reach a given destination location using resources including by way of example only, but not limited to, maps, road topology database, real-time traffic information, historical routes database, etc. If no destination location is input by the driver, then the Navigation System (101) may or may not provide locational information.

The Navigation Message Sender (102) receives turn-by-turn navigational directions from Navigation System (101) and sends the direction messages to Navigation Message Receiver (103) via one or more wired or wireless networks. Turn-by-turn navigation directions may contain a specified action (e.g. turn right/left, go on, exit right/left, u-turn, etc.), an immediate destination (e.g. Fifth Ave, US HWY 101, Exit 89B), and/or a distance to a location where the action should be taken (e.g. 100 m, 4 miles). The Navigation Message Receiver (103) receives the navigational messages from Navigation Message Sender (102) and provides them to the Display System (104).

The Display System (104) receives the navigational messages from Navigation Message Receiver (103) and displays the messages in a textual and/or visual representation. The message transformation is used, for example, if the original navigational message is too long to fit into the display screen. For example, if the original message is "Escuela Avenue" can be transformed into "Escuela Ave." In addition, if the transformed message is still too long to fit into the display screen, then animational display techniques may be utilized for effective display. For example, a text rotation technique wherein the displayed message is continuously shifted one letter by one letter towards left or right over time may be used.

In an embodiment, the Navigation Message Receiver (103) is connected to and acts in concert with a user signaling interface 105. The user signaling interface 105 may be for example a user-actuated lever, button, or other element for causing a turn signal to be displayed by the vehicle. For example, the user signaling interface 105 may be a turn signal lever on the steering column. In this embodiment, when the Navigation Message Receiver (103) receives an "on" signal from the user signaling interface 105, the Navigation Message Receiver (103), the Navigation Message Receiver (103) provides any navigational messages from the Navigation Message Sender (102) to the Display System (104). Similarly, when the Navigation Message Receiver (103) does not receive an "on" signal from the user signaling interface 105, the Navigation Message Receiver (103) does not provide any navigational messages from the Navigation Message Sender (102) to the Display System (104).

Thus, in this embodiment, when a user signals a turn, the system signals which turn will be taken, but when the user is not signaling a turn, no navigational message is displayed. This optional feature helps to avoid display of a false navigational message signal that might otherwise occur if the navigation system provides a navigation instruction that the user chooses to ignore.

The system 100 may be implemented in hardware or software depending upon the usage environment. In a hardware embodiment, the components of the system other than the display system 104 are implemented as one or more dedicated integrated circuits (ICs) or circuit assemblies. In the case of separate ICs, the components may communicate wirelessly or via hard-wired interconnections. Generally, if those components of the system are implemented as a single assembly, or at least one component of the system, if those components of the system are implemented via separate ICs, will embody a processor to execute the functions of the system.

In a software embodiment, the components of the system 100 other than the display 104 are implemented as software components or modules, residing on one or more processor-equipped devices or units, e.g., the in-vehicle telematics unit or otherwise. It will be appreciated that in an embodiment wherein the described functions are software driven, such functions are executed via the computerized execution, by the processor, of computer-executable instructions stored on a tangible non-transitory computer-readable medium such as an optical, magnetic, or flash drive, or a PROM, EPROM, etc.

Wireless interconnections may be used in various embodiments, e.g., to the display system 104, or between other components of the system 100. In these embodiments, such wireless interconnections may be transient or permanent, and may be via any suitable protocol, e.g., BLUETOOTH, ZIGBEE (or other 802.15x), 802.11x, etc.

Figure 2:
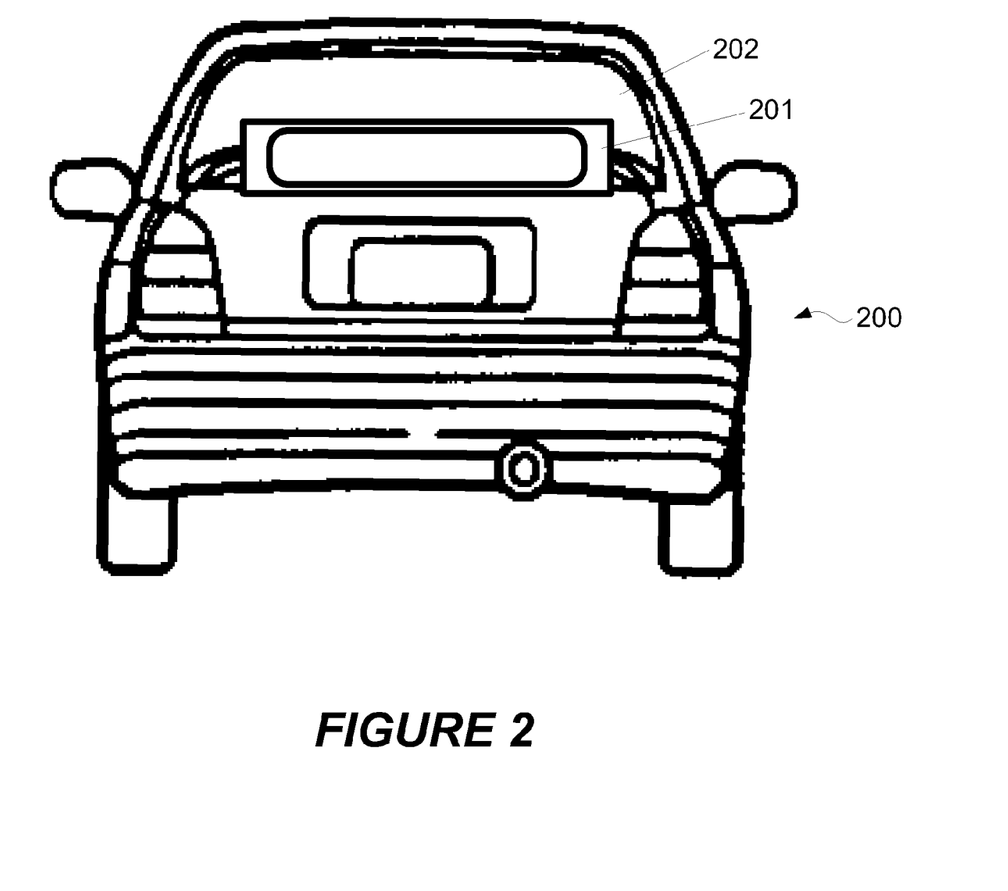
FIG. 2 depicts an example of display unit installation in a vehicle according to an embodiment of the invention.
Figure 3:
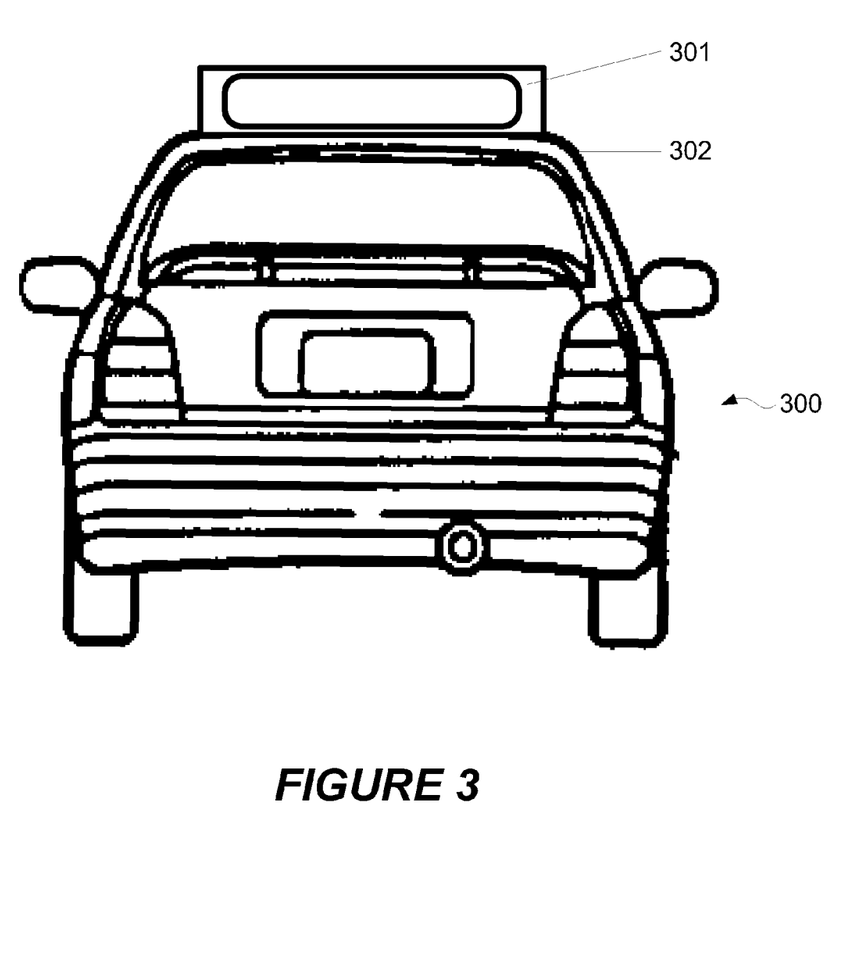
FIG. 3 depicts an example of an alternative display unit installation in a vehicle according to an embodiment of the invention.
Figure 4:
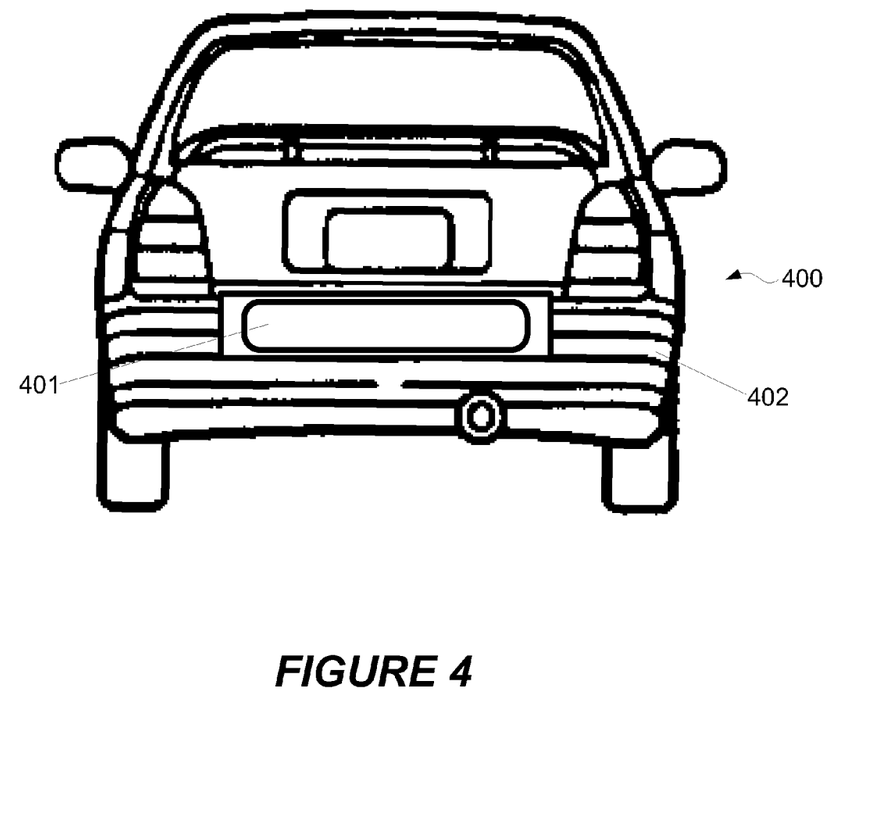
FIG. 4 depicts an example of yet another display unit installation in a vehicle according to an embodiment of the invention.

The Display System (104) can be installed in any part of vehicle where it may be legally placed and where drivers in trailing vehicles can see displayed navigation messages. FIG. 2, FIG. 3, and FIG. 4 depict non-limiting examples of different display unit installation in rear view of the vehicle. In particular, in FIG. 2, the display unit 201 is located on the lower part of the rear window 202 of the vehicle 200. The display unit 201 may be located inside or outside the vehicle 200 depending upon whether the display unit 201 has been water-proofed, and the means of communication used by the display unit 201. Thus, if the display unit 201 is waterproof and communicates with the rest of the system via a wireless channel, then it may easily be mounted externally.

FIG. 3 shows an alternative mounting the display unit 301. In this embodiment, the display unit 301 is mounted on the roof 302 of the vehicle 300. Similar to the latter embodiment discussed with respect to FIG. 2, the display unit 301 is preferably water-proofed and wirelessly linked in this embodiment.

As one final example, not intended to exclude other embodiments not explicitly shown, FIG. 4 shows an alternative external mounting of the display unit 401. In this embodiment, the display unit 401 is mounted on the rear bumper 402 of the vehicle 400. Again, it is preferred but not required that the display unit 401 be water-proofed and be connected to the remainder of the system wirelessly. The latter preference would avoid needing to run hard wiring of the system upon installation and would allow easy repositioning of the system by the user.

Figure 5:
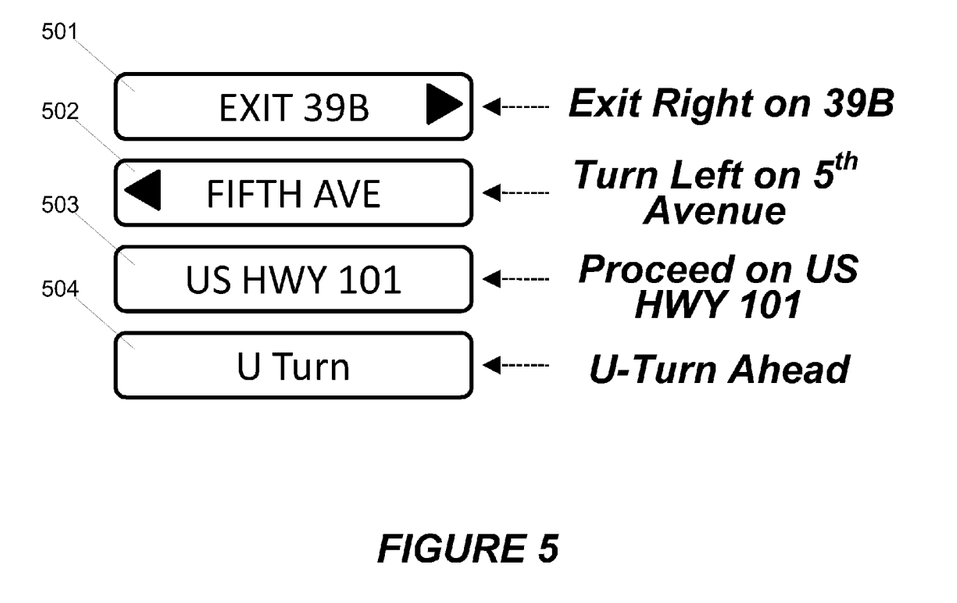
FIG. 5 depicts examples of navigational messages shown on the display system in an embodiment of the invention.

Although the exact format and type of navigational message used in embodiments of the invention are not critical, FIG. 5 illustrates several exemplary messages and their meaning. As can be seen, the message 501 "39B' accompanied by a right arrow may mean "exit right on 39B." Similarly, the message 502 "Fifth Ave" may correspond to the direction "turn left on $5^{th}$ Avenue." As can be seen, while certain messages may have both a direction and a textual message, other messages only have a textual content, as with messages 503 and 504. Thus, message 503, i.e., "US HWY 101" corresponds to a direction of "Proceed on US HWY 101" while the message 504 "U Turn" corresponds to a direction of "U-Turn Ahead."

Figure 6:
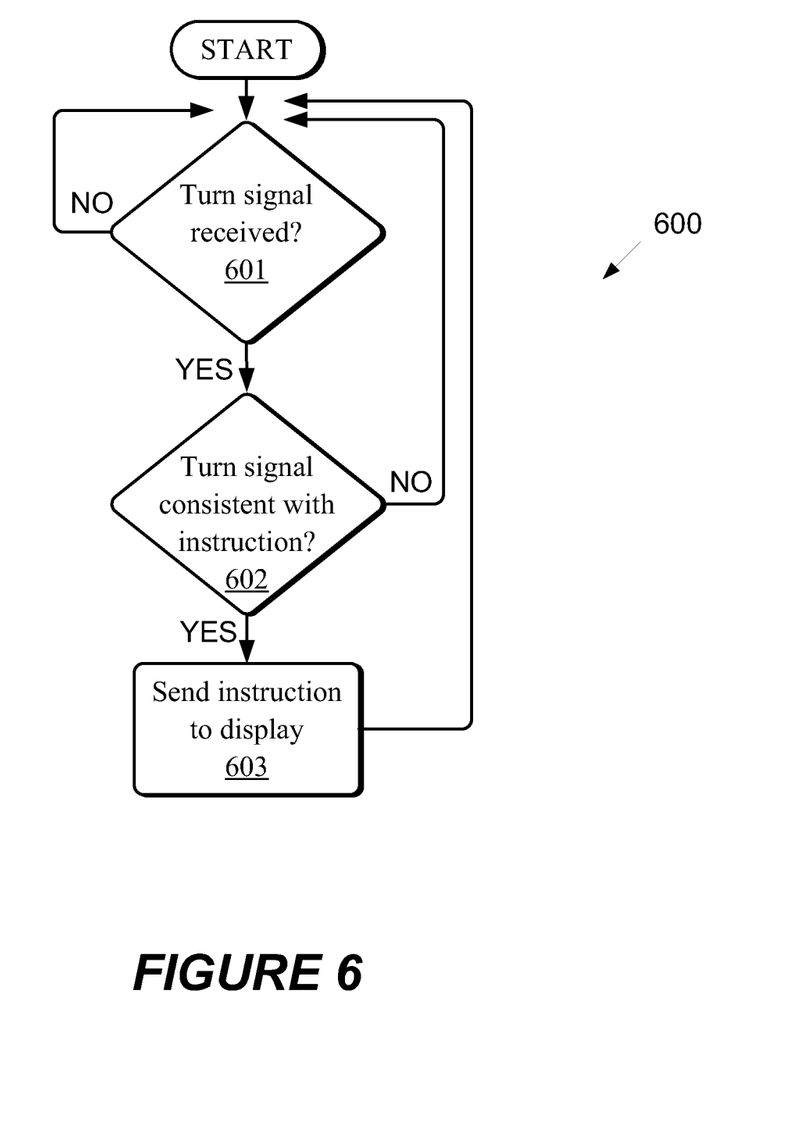
FIG. 6 is a flow chart of a process according to an embodiment of the invention for coordinating a navigational message display with receipt of a turn signal.

A process 600 for displaying navigational messages is shown in the flow chart of FIG. 6. The process 600 begins at stage 601, wherein the Navigation Message Receiver 103 determines whether a turn signal has been received from the user signal interface 105. If a turn signal has been received from the user signal interface 105, the process 600 flows to stage 602, wherein the Navigation Message Receiver 103 determines whether the received turn signal is consistent with a current instruction of the system. For example, if a left turn signal is received, and the current navigational instruction is to take a left turn on HWY X, then the turn signal and navigational instruction may be deemed consistent. On the other hand, if a left turn signal is received and the current navigational instruction is to bear right on Exit 1, then the turn signal and navigational instruction may be deemed inconsistent.

If at stage 602 it is determined that the received turn signal is consistent with a current instruction of the system, then the Navigation Message Receiver 103 sends the current instruction or an abbreviation thereof to the display system 104 at stage 603. Otherwise, the process 600 returns to stage 601, where the Navigation Message Receiver 103 awaits receipt of a turn signal.

It will be appreciated that a new system and method of conveying navigational instructions in conjunction with a turn signal has been disclosed. All references herein, including publications, patent applications, and patents, cited herein are hereby incorporated by reference to the same extent as if each reference were individually and specifically indicated to be incorporated by reference and were set forth in its entirety herein. The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for providing an externally visible signal regarding a navigational instruction at a vehicle, the system comprising:
a navigation system for generating and outputting turn-by-turn navigational directions within the vehicle to assist a driver of the vehicle in reaching a given destination location;
a navigation message sender for receiving turn-by-turn navigational directions from the navigation system and transmitting corresponding navigational messages;
a navigation message receiver for receiving the navigational messages from the navigation message sender; and
a display system for receiving the navigational messages from the navigation message receiver and in response displaying, a directional message in a manner visible outside the vehicle, a directional message based on the navigational messages;
wherein the navigation message receiver is linked to a user signaling interface;
wherein the user signaling interface includes at least one of a user-actuated lever and a user-actuated button for causing a turn indication to be display by the vehicle; and
wherein the navigation message receiver is configured to receive a turn signal from the user signaling interface, to determine whether the received turn signal is consistent with a current received navigational message, and to provide the current navigational message to the display system only in the case that the received turn signal is consistent with the current received navigational message.

2. The system for providing an externally visible signal regarding a navigational instruction at a vehicle according to claim 1, wherein the navigation message receiver is configured to provide the turn-by-turn navigation directions to the display system based on an external signal.

3. The system for providing an externally visible signal regarding a navigational instruction at a vehicle according to claim 2, wherein the navigation message receiver is configured to provide the navigational messages from the navigation message sender to the display system when the user signaling interface is activated and to not provide the navigational messages from the navigation message sender to the display system when the user signaling interface is not activated.

4. The system for providing an externally visible signal regarding a navigational instruction at a vehicle according to claim 1, wherein the navigation system is adapted to generate the turn-by-turn navigational directions by using at least one of a map, a road topology database, real-time traffic information, and a historical routes database.

5. The system for providing an externally visible signal regarding a navigational instruction at a vehicle according to claim 1, wherein the navigation message receiver is configured to transmit the navigational messages to the display system via a wireless signal.

6. The system for providing an externally visible signal regarding a navigational instruction at a vehicle according to claim 1, wherein the turn-by-turn navigation directions contain at least one of a specified action, an immediate destination, and a distance to a location where an action should be taken.

7. The system for providing an externally visible signal regarding a navigational instruction at a vehicle according to claim 1, wherein the display system is configured to convert the navigation directions to at least one of an abbreviation, a scrolling format, and a rotating format.

8. The system for providing an externally visible signal regarding a navigational instruction at a vehicle according to claim 1, wherein the displayed directional message includes a textual portion and a graphical portion.

9. A method for providing an externally visible signal at a vehicle to signal a trailing driver of an imminent turn of the vehicle, the method comprising:
  generating turn-by-turn navigational directions within the vehicle to direct a driver of the vehicle in reaching a given destination location;
  determining whether the driver of the vehicle has actuated a user-selectable turn indicator; and
  providing a message based on the turn-by-turn navigational directions to an external display system when the driver of the vehicle has actuated the user-selectable turn indicator only in the case that the turn indicator is consistent with a current one of the turn-by-turn navigational directions, wherein a display surface of the external display system is visible outside the vehicle.

10. The method according to claim 9, wherein the user signaling interface includes at least one of a user-actuated lever and a user-actuated button for causing a turn signal to be displayed by the vehicle.

11. The method according to claim 9, wherein generating the turn-by-turn navigational directions within the vehicle comprises generating the turn-by-turn navigational directions by using at least one of a map, a road topology database, real-time traffic information, and a historical routes database.

12. The method according to claim 9, wherein providing a message based on the turn-by-turn navigational directions to the external display system comprises transmitting the navigation directions to the external display system via a wireless signal.

13. The method according to claim 9, wherein the turn-by-turn navigation directions contain at least one of a specified action, an immediate destination, and a distance to a location where an action should be taken.

14. The method according to claim 9, further comprising converting the navigation directions to at least one of an abbreviation, a scrolling format, and a rotating format.

15. The method according to claim 9, further comprising displaying the message based on the turn-by-turn navigational directions on a display surface of the external display system.

16. The method according to claim 9, wherein the message based on the turn-by-turn navigational directions includes a textual portion and a graphical portion.

17. The method according to claim 9, wherein the external display system is located at one of a top of the vehicle, a window of the vehicle, and a bumper of the vehicle.

18. An apparatus for alerting a vehicle non-occupant of an imminent turn of the vehicle, including:
  a navigation interface; and
  an external display device configured to be mounted to an external surface of the vehicle, wherein the navigation interface is configured to interface to an in-vehicle guidance system, a user-actuated turn signal, and the external display device, such that when the user-actuated turn signal is active, turn-by-turn directions are retrieved from the in-vehicle guidance system and a directional message based on the turn-by-turn directions is provided to the external display device for display to the non-occupant only in the case that the turn signal is consistent with a current one of the turn-by-turn directions.

* * * * *